United States Patent [19]

Shimamura

[11] Patent Number: 5,191,273
[45] Date of Patent: Mar. 2, 1993

[54] OPERATING CONTROL DEVICE AND METHOD FOR WOUND-ROTOR INDUCTION MACHINE

[75] Inventor: Takeo Shimamura, Tokyo, Japan

[73] Assignee: Kabushiki Kaisha Toshiba, Kawasaki, Japan

[21] Appl. No.: 905,146

[22] Filed: Jun. 23, 1992

Related U.S. Application Data

[63] Continuation of Ser. No. 798,703, Nov. 29, 1991, abandoned.

[30] Foreign Application Priority Data

Nov. 28, 1990 [JP] Japan ................................ 2-328471

[51] Int. Cl.$^5$ .............................................. H02P 5/40
[52] U.S. Cl. ..................................... 318/828; 318/811; 318/823; 318/732
[58] Field of Search ............... 318/809, 810, 811, 812, 318/823, 827, 828, 732

[56] References Cited

U.S. PATENT DOCUMENTS

| | | | |
|---|---|---|---|
| 3,426,260 | 2/1969 | Lee et al. | 318/828 |
| 3,439,245 | 4/1969 | Perdue | 318/828 |
| 4,364,004 | 12/1982 | Bourbeau | 318/811 |
| 4,388,579 | 6/1983 | Ellis | 318/828 |
| 4,437,051 | 3/1984 | Moto et al. | 318/811 |
| 4,617,675 | 10/1986 | Ashikaga et al. | 318/811 |

Primary Examiner—William M. Shoop, Jr.
Assistant Examiner—John W. Cabeca
Attorney, Agent, or Firm—Foley & Lardner

[57] ABSTRACT

This invention proposes an operating control device and method for a winding type induction machine that ensures that the harmonic components naturally present in the primary voltage of a winding type induction machine, do not correspond to the antiresonance point of the impedance characteristic of the transmission system to which the winding type induction machine is connected. Those corresponding harmonic components are eliminated from the primary winding of the winding type induction machine by applying appropriate voltage command values to a PWM controlled inverter if there is distortion of the primary voltage or if the transmission system is being changed over.

7 Claims, 4 Drawing Sheets

OPERATING CONTROL DEVICE AND METHOD FOR WOUND-ROTOR INDUCTION MACHINE

This application is a continuation of application Ser. No. 07/798,773, filed Nov. 29, 1991, now abandoned.

BACKGROUND OF THE INVENTION

This invention relates to an operating control device for a winding type induction machine. In particular, it relates to an operating control device for a winding type induction machine wherein a winding type induction machine is operated with secondary excitation control of the secondary current performed using a PWM-controlled inverter.

For example in the most modern hydro-electric power stations, the need for a so-called variable-speed power generating system, wherein the induction machine is operated at the rotational speed at which the turbine efficiency is a maximum with respect to head changes or load changes has increased. In a hydro-electric generator plant with such a variable speed power generation system, a winding type induction machine is operated with variable speed. Such an operating control device for a winding type induction machine is disclosed in the literature: for example the system disclosed in paragraph 96, FIG. 3.2.11 of Collected Research Theses BMFT-FB-T84-154 (1) of the West German Bundesministerium fuer Forschung und Technologie. The system disclosed in this reference is known as a secondary excitation type variable speed power generating system, in which the primary side frequency is controlled to a constant irrespective of changes in rotational speed, by controlling the secondary current of the winding type induction machine using a frequency converter such as a cyclo converter or PWM controlled inverter. This system has the characteristic advantage that the capacity of the converter can be made small, so it can be applied in particular to large-capacity generating plants.

A generating plant is operated as part of a complex transmission system. In this transmission system, the transmission line has inductance, resistance and stray capacitance distributed along it. Shunt reactors and phase-advance capacitors are provided to improve the power factor. The impedance when the transmission system side is seen from the generating plant therefore has a frequency characteristic. Furthermore, when the transmission system is employed it is switched in a complex manner in response to power flow conditions, so this impedance characteristic is not fixed, but varies.

FIG. 1 is a view showing an example of how harmonic components, if such are present in the primary voltage of the induction machine, are transmitted to the output side of the generating plant, i.e. to the transmission system, when the generating plant is being switched into the transmission system.

FIG. 1 shows an example characteristic in which, due to the impedance characteristic of the transmission system, harmonic components present in the primary voltage of the induction machine are amplified with a peak as indicated by point a. This point is called the "antiresonance point" possessed by the transmission system. In a transmission system having such a characteristic, if the primary voltage of the induction machine were to contain even a slight harmonic component coinciding with point a, because of the antiresonance point, this component would be amplified, producing extreme distortion at the output voltage end of the generating plant. It is undesirable to operate the induction machine in such a condition of large voltage distortion, so this situation must be avoided.

The harmonic components contained in the primary voltage of the induction machine are practically proportional to the harmonic components contained in the secondary excitation voltage of the induction machine. If a PWM controlled inverter is used in the frequency converter for secondary excitation, the output voltage waveform of this inverter contains harmonic components, so these harmonic components have an effect on the harmonic components of the primary voltage of the induction machine.

FIG. 2 is a characteristic showing an example of a typical output voltage waveform of a three phase PWM controlled inverter for secondary excitation. In FIG. 2, v2u*, v2v*, and v2w* are voltage commands to the inverter, whose output frequency is $f_0$. $e_s$ is a modulation triangular wave for PWM control, whose repetition frequency i.e. modulation frequency is $f_s$. Switching elements constituting the inverter are controlled by comparing these voltage commands v2u*, v2v* and v2w* with modulation triangular wave $e_s$, whereupon the fundamental frequency of the output voltage of the inverter is determined by the frequency $f_0$ of the voltage commands and a typical PWM controlled inverter output voltage is obtained in which the repetition frequency of a pulse train that changes in square-wave fashion is determined by the frequency $f_s$ of the modulation triangular wave.

The harmonic components contained in this PWM controlled inverter output voltage vuv are expressed by the following equations, taking the frequency of the modulation triangular wave $e_s$ as $f_s$ and the frequency of the voltage commands v2u*, v2v* and v2w* as $f_0$:

$$f_H = nf_s \pm kf_0$$

where
n is an integer, 0 to $\infty$
and k is an integer, 0 to $\infty$

As is clear for the above equation, the harmonic components contained in this PWM controlled inverter output voltage change depending on both the frequency $f_0$ of the voltage commands and the frequency $f_s$ of the modulation triangular wave. In operation of an ordinary PWM controlled inverter, the frequency $f_s$ of the modulation triangular wave is fixed at a constant value, but the output frequency $f_0$ changes over a wide range, so the harmonic components of the output voltage of the inverter change in a complex manner. Consequently, even in a variable speed generating system, the harmonic components contained in the output voltage change in a complex manner because the frequency of the PWM controlled inverter, which constitutes the secondary excitation power source, is controlled in a manner matching the rotational speed of the induction machine.

Accordingly, in the variable speed generating system employing a PWM controlled inverter, in the variable speed range, the modulation frequency $f_s$ of the secondary excitation voltage is determined such that no harmonic component corresponding to antiresonance point a of FIG. 1 is contained in the primary voltage of the induction machine. However, due to demands imposed in use of the transmission system, when operation is performed with the transmission system being switched over, the impedance characteristic of the transmission system changes, causing the antiresonance point to be displaced. This may result in harmonics contained in the primary voltage of the induction machine coinciding with the antiresonance point. In such cases, the distortion of the primary voltage of the induction machine is enormously increased. This may make it impossible to continue operation.

In this respect, in the system disclosed in the literature reference described above, voltage distortion of the primary voltage of the induction machine is not discussed, and, even when the transmission system is being switched over because of power system requirements, no measures are taken to ensure a stable induction machine primary voltage with little distortion. Development of an operating control device for a winding type induction machine wherein control is performed to make the primary voltage of the induction machine stable with little distortion even when the transmission system is being switched over because of power transmission requirements is now therefore being urgently called for.

SUMMARY OF THE INVENTION

The object of this invention is therefore to provide an operating control device and method for a winding type induction machine of extremely high reliability wherein operation can be conducted such as to give a stable voltage with little distortion even when the impedance characteristic of the transmission line is changing in a complex manner due to the transmission system being switched over etc.

The object of this invention as described above is achieved by the means and steps described below.

An operating control device according to this invention for a winding type induction machine wherein operation is performed by secondary excitation control, using a PWM controlled inverter, of the secondary current of a winding type induction machine connected to a transmission system, comprises:

voltage distortion detection means that detects the voltage distortion of the primary voltage of the winding type induction machine;

primary voltage phase detection means that detects the phase of the primary voltage of the winding type induction machine;

rotor phase detection means that detects the rotational phase of a rotor of the winding type induction machine;

secondary voltage phase calculation means that calculates the phase of the secondary voltage of the winding type induction machine based on the primary voltage phase detected by the voltage phase detection means and on the rotor phase detected by the rotor phase detection means;

secondary current control means that calculates a voltage command signal for the PWM controlled inverter based on the secondary current of the winding type induction machine, the current command value, and the secondary voltage phase obtained by the secondary voltage phase calculation means; and gate control means that outputs to the PWM controlled inverter a gate control signal for performing PWM control by modulating the voltage command signal with a triangular wave of modulation frequency responsive to the magnitude of the voltage distortion signal, by inputting a voltage command signal from the secondary current control means and a voltage distortion signal from the voltage distortion detection means.

An operating control method according to this invention for a winding type induction machine wherein operation is performed by secondary excitation control, using a PWM controlled inverter, of the secondary current of a winding type induction machine connected to a transmission system, comprises:

a step wherein the voltage distortion of the primary voltage of the winding type induction machine is detected;

a step wherein the rotational phase of a rotor of the winding type induction machine is detected;

a step wherein the phase of the secondary voltage of the winding type induction machine is calculated based on the detected primary voltage phase and on the detected rotor phase;

a step wherein a voltage command signal for the PWM controlled inverter is calculated based on the secondary current of the winding type induction machine, the current command value, and the calculated secondary voltage phase; and a step wherein there is output to the PWM controlled inverter a gate control signal for performing PWM control by modulating the voltage command signal with a triangular wave of modulation frequency responsive to the magnitude of the voltage distortion signal, by inputting the calculated voltage command signal and the detected voltage distortion signal.

An operating control device for a winding type induction machine wherein operation is performed by secondary excitation control, using a PWM controlled inverter, of the secondary current of a winding type induction machine connected to a transmission system, comprises:

primary voltage phase detection means that detects the phase of the primary voltage of the winding type induction machine;

rotor phase detection means that detects the rotational phase of a rotor of the winding type induction machine;

secondary voltage phase calculation means that calculates the phase of the secondary voltage phase calculation means that calculates the phase of the secondary voltage of the winding type induction machine based on the primary voltage phase detected by the voltage phase detection means and on the rotor phase detected by the rotor phase detection means;

secondary current control means that calculates a voltage command signal for the PWM controlled inverter based on the secondary current of the winding type induction machine, the current command value, and the secondary voltage phase obtained by the secondary voltage phase calculation means; and gate control means that outputs to the PWM controlled inverter a gate control signal for performing PWM control by inputting a voltage command signal form the secondary current control means and a transmission system changeover signal from a power command center and modulating the voltage command signal with a triangular wave of modulation frequency predetermined in accordance with the transmission system changeover signal.

An operating control method according to this invention for a winding type induction machine wherein operation is performed by secondary excitation control, using a PWM controlled inverter, of the secondary current of a winding type induction machine connected to a transmission system, comprises:

- a step in which the phase of the primary voltage of the winding type induction machine is detected;
- a step in which the rotational phase of a rotor of the winding type induction machine is detected;
- a step in which the phase of the secondary voltage of the winding type induction machine is calculated based on the detected primary voltage phase and on the detected rotor phase;
- a step in which a voltage command signal for the PWM controlled inverter is calculated based on the secondary current of the winding type induction machine, the current command value, and the calculated secondary voltage phase; and
- a step of inputting the detected voltage command signal and a transmission system changeover signal from a power command center, modulating the voltage command signal with a triangular wave of modulation frequency that is predetermined in accordance with the transmission system changeover signal, and outputting a gate control signal for performing PWM control to the PWM controlled inverter.

DETAILED DESCRIPTION OF THE PREFERRED EMBODIMENTS

Figure 3:
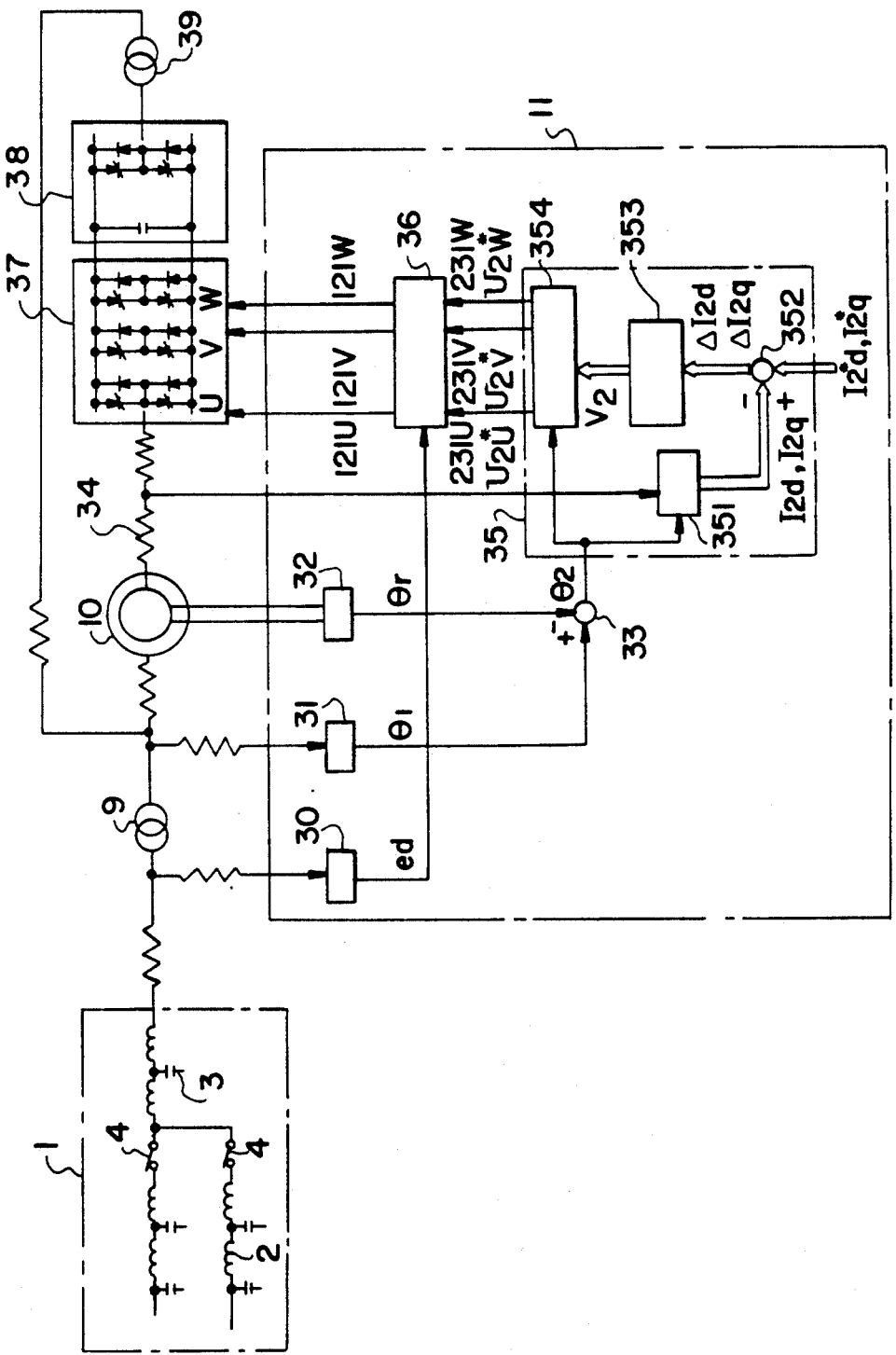
FIG. 3 is a block diagram showing an embodiment of an operating control device for a winding type induction machine according to this invention.

FIG. 3 shows an embodiment of an operating control device for a winding type induction machine according to this invention. In FIG. 3, a winding type induction machine 10 is connected to a transmission system by a main transformer 9. Inductance 2 and stray capacitance 3 are distributed on power system 1 and the system layout is altered by opening and closing a circuit breaker 4.

An operation control device 11 of this invention controls operation of this winding type induction machine 10. In more detail, conversion of the D.C. voltage of a D.C. power source 38 to a prescribed secondary voltage is performed by gate control of a PWM controlled inverter 37. This controls the magnitude and frequency of the primary voltage of induction machine 10 to a constant.

The phase $\theta_1$ of the primary voltage of winding type induction machine 10 is detected by a primary voltage phase detection means 31 of operation control device 11. The rotational phase $\theta_r$ of the rotor of winding type induction machine 10 is detected by a rotational phase detection means 32.

The deviation between primary voltage phase $\theta_1$ detected by voltage phase detection means 31 and rotational phase $\theta_r$ detected by rotational phase detection means 32 i.e. secondary voltage phase $\theta_2$ is obtained by a secondary voltage phase calculating means 33. This secondary voltage phase $\theta_2$ indicates the frequency of the secondary voltage of winding type induction machine 10.

Secondary voltage phase $\theta_2$ obtained by this secondary voltage phase calculating means 33 is input into a three-phase to two-phase converter means 351 and a voltage command generating means 354 of a secondary current control means 35.

Three-phase to two-phase converter means 351 converts the three-phase secondary current of the induction machine detected by a current detection means 34 to a two-phase secondary current consisting of active component I2d and reactive component I2q. Secondary voltage phase $\theta_2$ obtained by secondary voltage phase calculating means 33 is used as a calculation parameter in this conversion.

This active component I2d and reactive component I2q of the secondary current calculated by three phase to two phase converter means 351 are input to comparison means 352, where they are compared with predetermined current command values I*2d and I*dq. The active component deviation DELTA I2d and reactive component deviation DELTA I2q respectively are then calculated.

Active component deviation DELTA I2d and reactive component deviation DELTA I2q of the secondary current calculated by comparison means 352 are then input to a calculation means 353 which converts them into the corresponding active component deviation DELTA V2d and reactive component deviation DELTA V2q of the secondary voltage.

Active component deviation DELTA V2d and reactive component deviation DELTA V2q of the secondary voltage calculated by calculation means 353 are then input to voltage command generating means 354. Voltage command generating means 354 converts active component deviation DELTA V2d and reactive component deviation DELTA V2q of the secondary voltage into three phase voltage commands V*2U, V*2V, and V*2W. The frequency of voltage commands V*2U, V*2V, and V*2W is determined using secondary voltage phase $\theta_2$ calculated by secondary voltage phase calculating means 33 as a calculation parameter in the conversion.

Voltage commands V*2U, V*2V, and V*2W from voltage command generating means 354 are input to a gate control means 36. Gate control means 36 also inputs a signal $e_d$ indicating the degree of voltage distortion from a primary voltage distortion detection means 30 of induction machine 10.

Figure 1:
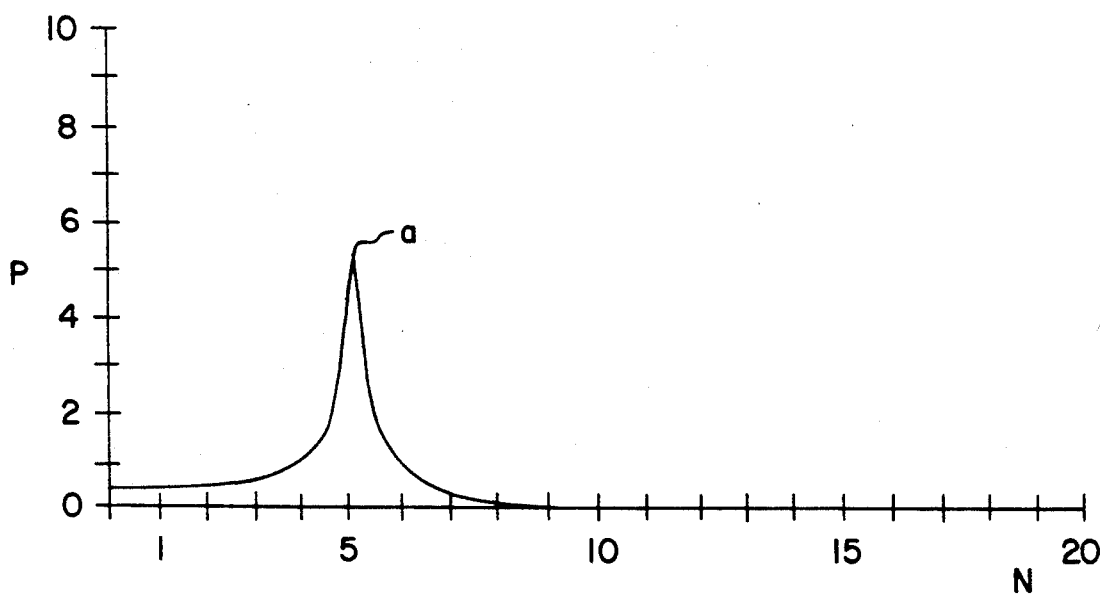
FIG. 1 is a characteristic given in explanation of the frequency characteristic possessed by a transmission system.
Figure 2:
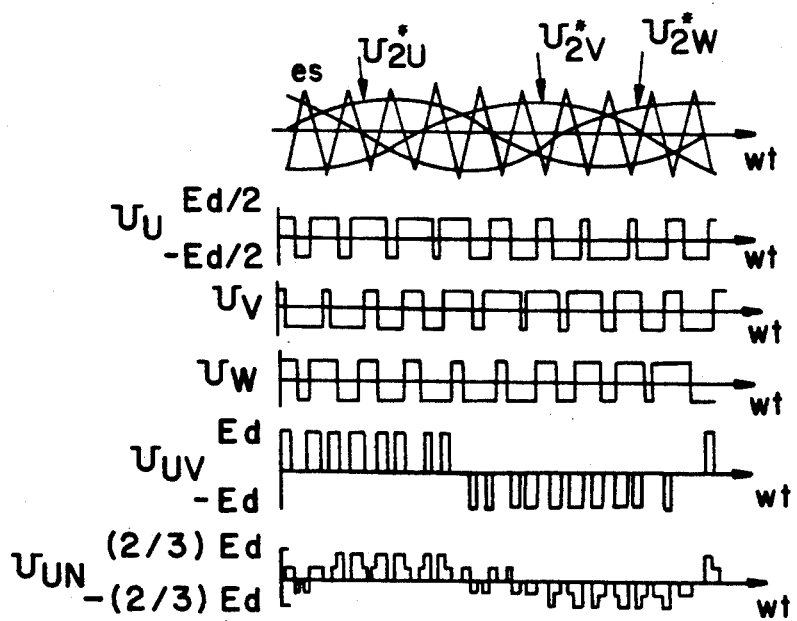
FIG. 2 is a diagram given in explanation of the operation of a PWM controlled inverter.

The voltage distortion $e_d$ is mainly effected by the higher harmonic components at the antiresonant frequency of the transmission line (shown in FIG. 1). Other higher harmonic components may be contained but have only slight effect on voltage distortion $e_d$. The value $e_d$ is derived as follows:

$$e_d = \frac{\sqrt{|V|^2 - |V_1|^2}}{|V_1|^2}$$

where:
$V = V_1 \sin\omega t + V_2 \sin 2\omega t + \ldots + V_n \sin n\omega t$ (with $V_2 \ldots V_n$ terms being harmonic components)
$V_1 = V_1 \sin \omega t$
$|V|^2 = |V_1|^2 + |V_2|^2 + \ldots + |V_n|^2$
$|V_1|^2 = |V_1|^2$
$e_d$: Voltage distortion
V: transmission line voltage
$V_1$: fundamental wave component of transmission line voltage The detector 30, for example, can be implemented using the Hewlett Packard HP4195A.

When gate control means 36 inputs voltage commands v2u*, v2v* and v2w* from the voltage command generating means of current control means 35 and voltage distortion signal $e_d$ from voltage distortion detection means 30, if the magnitude of voltage distortion signal $e_d$ is within a range less than a prescribed value ($e_d2$), it carries out PWM control with the modulation triangular wave of preset modulation frequency $f_s$. If voltage distortion signal $e_d$ is greater than the prescribed value $e_d1$, it carries out PWM control with modulation frequency $f_s$ changed from its pre-set value by an amount responsive to the magnitude of voltage distortion signal $e_d$. An example of the detailed layout of this gate control means 36 is shown in the block diagram of FIG. 4.

Gate control means 36 consists of a modulation frequency setting means 361 that sets modulation frequency $f_s$ of PWM controlled inverter 37, a function generating means 362 that inputs the output signal $e_d$ from voltage distortion detection means 30, a calculating means 363 that adds the output signal from modulation frequency setting means 361 and the output signal from function generating means 362, a triangular wave generating means 364 that outputs triangular wave $e_s$ of prescribed modulation frequency $f_s$ based on the output signal from this calculating means 363, and comparison means 120U, 120V, and 120W that output gate signals 121U, 121V, and 121W to PWM controlled inverter 37 by comparing voltage e commands V*2U, V*2V and V*2W from voltage command generating means 354 with triangular wave $e_s$ from this triangular generating means 364.

Figure 4A:
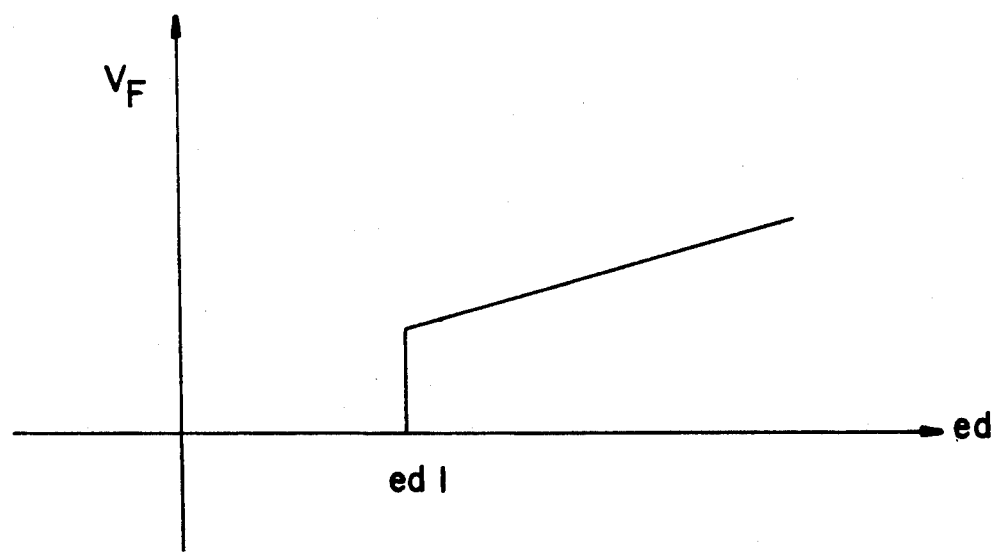
FIG. 4A is a graph showing the characteristics of the function generator.

The characteristic of function generator 362 is shown in FIG. 4A. $V_F$, output to calculation means 363, is $\theta$ until the $e_d$ threshold e, is reached. This is where the magnitude of the distortion $e_d$ is greater than the prescribed value.

Triangular wave generating means 364 consists of a pulse generator 111 that generates pulses corresponding to the magnitude of the output signal from calculation means 363, a counter 113 that counts the number of pulses from this pulse generator 11 and a triangular wave generator 115 that changes the modulation frequency $f_s$ in accordance with the number of pulses counted by counter 113.

Let us now assume that the distortion of the primary voltage of induction machine 10 is detected by voltage distortion detection means 30. When this happens, a voltage distortion signal $e_d$ proportional to this voltage distortion is input to function generating means 362 of gate control means 36.

Modulation frequency $f_{s0}$ for PWM control of the fixed frequency with which PWM controlled inverter 37 ought to be operated is set in modulation frequency setting means 361 of gate control means 36. However, the function which is set in function generating means 362 is as follows. Specifically, if voltage distortion signal $e_d$ is less than the prescribed value, its output signal is set to zero. If voltage distortion signal $e_d$ is greater than the prescribed value, its output signal is set to a value proportional to voltage distortion signal $e_d$. Therefore, if voltage distortion signal $e_d$ is greater than the prescribed value, triangular wave generating means 364 outputs a modulation triangular wave $e_s$ of modulation frequency $f_s$ proportional to the output signal of calculation means 363.

The gate signals for PWM control are produced by comparison of this modulation triangular wave $e_s$ with voltage command signals V*2U, V*2V, and V*2W performed by comparison means 120U, 120V, and 120W.

Thus, the content of harmonic components in the primary voltage having an antiresonance characteristic of the transmission system can be reduced by changing the gate signal in accordance with the voltage distortion.

In the operating control device of this embodiment, when the magnitude of the voltage distortion of the primary voltage of induction machine 10 exceeds a prescribed value, the frequency $f_s$ of modulation triangular wave $e_s$ is adjusted in accordance with the magnitude of this voltage distortion. The voltage distortion of the primary voltage of winding type induction machine 10 can therefore be reduced by changing the harmonic frequency components contained in the output voltage of PWM controlled inverter 37. That is, even when the generating plant is switched into a power system wherein a transmission system having an antiresonance characteristic is being switched over in a complex way, operation with small distortion can always be achieved.

Figure 4:
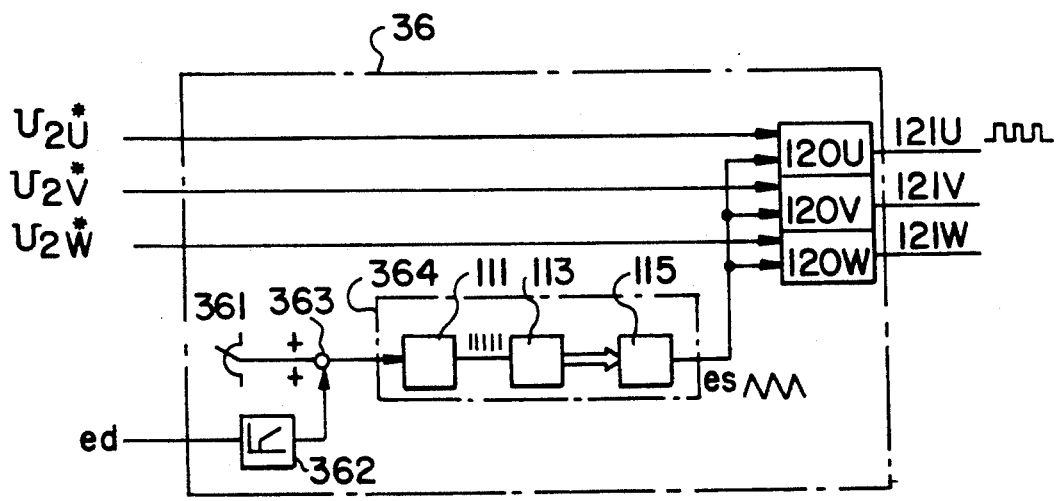
FIG. 4 is a block diagram showing an example basic layout of gate control means of this invention.
Figure 5:
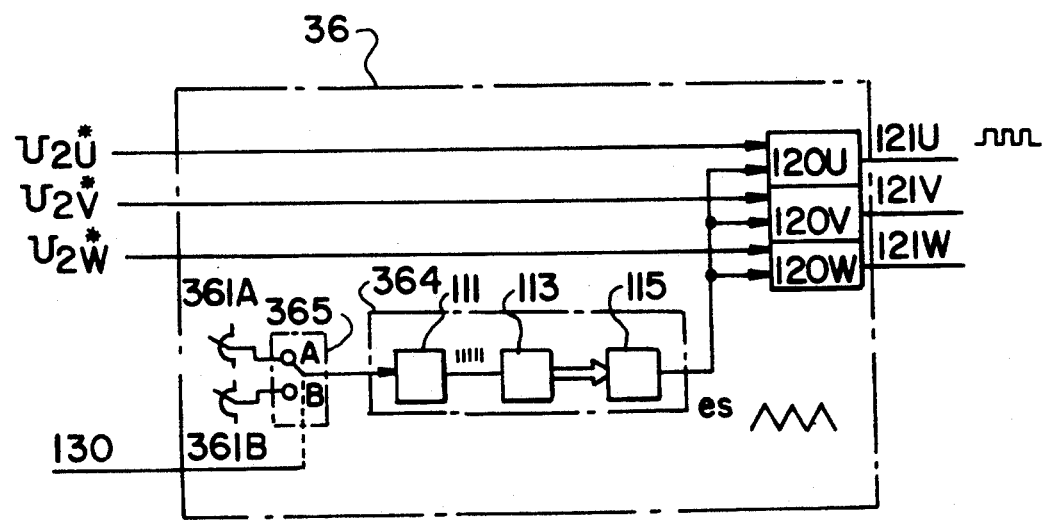
FIG. 5 is a block diagram showing another example basic layout of gate control means of this invention.

FIG. 5 is a block diagram showing another embodiment of gate control means 36. Parts which are the same as in FIG. 4 are given the same reference numerals.

In general, stable operation of a power system is sought to be achieved by suitable switching over of the transmission system performed by monitoring the power flow on the transmission system at a power command center. Thus, the power command center always has under control how the power system is being switched and operated. The switching condition of the transmission system can therefore be advised to every generating plant that is being switched into the power system.

FIG. 5 shows an example layout of gate control means 36 when a generating plant having a winding type induction machine is employed in such a power system. In FIG. 5, reference numeral 130 indicates a transmission system switching signal that is supplied from the power command center; 361A indicates a first modulation frequency setting means; 361B indicates a second modulation frequency setting means; and 365 indicates a switching means that appropriately changes over between the outputs of first and second modulation frequency setting means 361A and 361B in response to transmission line switching signal 130 and delivers the selected output as input to triangular wave generating means 364.

In a gate control means 36 constructed as above, before the transmission line is changed over, changeover switch 365 is changed over to the A side. Power distortion can then be reduced by ensuring that no harmonic component of the primary voltage of induction machine 10 coincides with the antiresonance point of the transmission system, by controlling PWM controlled inverter 37 with modulation frequency $f_{s1}$ that is set by first modulation frequency setting means 361A. Next, if the transmission system is changed over, transmission line switching signal 130 is input and changeover means 365 is actuated, causing changeover means 365 to be changed over to side B. PWM controlled inverter 37 is then controlled with modulation frequency $f_{s2}$ that is set by second modulation frequency $f_{s2}$ of second modulation frequency setting means 361B is set such that no harmonic component of the primary voltage of induction machine 10 coincides with the antiresonance point of the power system, taking into account the transmission system characteristics after the previous switching over of the transmission line. Operation can therefore be continued with little voltage distortion even after switching over of the transmission system. It is also possible to reduce device costs since the voltage distortion detection means 30 of FIG. 3 can be eliminated by using the gate control means 36 of FIG. 5.

As described above, with this invention, the voltage distortion of the primary voltage of a winding type induction machine can be reduced by changing the content of harmonic components of the output voltage of the PWM controlled inverter. This is done by adjusting the modulation frequency that determines the ON/OFF periods of the switching elements of the PWM controlled inverter in response to the magnitude of the voltage distortion, if the detected value of such voltage distortion in the primary voltage of the winding type induction machine exceeds a prescribed value. A stable primary voltage with little voltage distortion can therefore be achieved even when the impedance characteristic of the transmission line is changing in a complex manner due to changeover of the transmission system etc. Hence an operating control device for a winding type induction machine can be provided which is of very high reliability.

What is claimed is:

1. Operating control device for a winding type induction machine wherein control utilizes a PWM controlled inverter for secondary current excitation control of the winding type induction machine connected to a transmission system, comprising:

voltage distortion detection means for detecting a voltage distortion of a primary voltage of said winding type induction machine and producing a voltage distortion signal;

primary voltage phase detection means for detecting a phase of said primary voltage of said winding type induction machine and producing a detected primary voltage phase;

rotor phase detection means for detecting a rotational phase of a rotor of said winding type induction machine and producing a detected rotational phase;

secondary voltage phase calculation means for calculating a phase of a secondary voltage of said winding type induction machine responsive to said detected primary voltage phase and said detected rotational phase and producing a calculated secondary voltage phase;

secondary current control means for calculating voltage command signals for said PWM controlled inverter, responsive to a secondary current of said winding type induction machine, a current command value, and said calculated secondary voltage phase and outputting said voltage command signals; and gate control means, responsive to said voltage command signals from said secondary current control means and said voltage distortion signal from said voltage distortion detection means, for outputting to said PWM controlled inverter gate control signals for performing PWM control, by modulating said voltage command signals with a triangular wave of modulation frequency responsive to a magnitude of said voltage distortion signal.

2. Operating control device for a winding type induction machine as recited in claim 2, wherein said secondary current control means calculates said voltage command signals such that a frequency of said secondary current is a frequency calculated by said secondary voltage phase calculating means, and a value of said secondary current constitutes said current command value.

3. Operating control device for a winding type induction machine as recited in claim 2, wherein said gate control means outputs to said PWM controlled inverter a gate control signal for performing PWM control wherein, if the magnitude of the voltage distortion signal detected by said voltage distortion detection means is less than a predetermined value, said voltage command signal is modulated with a triangular wave of predetermined modulation frequency, but, if the magnitude of said voltage distortion signal exceeds said predetermined value, said voltage command signal is modulated with a triangular wave of modulation frequency responsive to a magnitude of said voltage distortion signal.

4. Operating control method for a winding type induction machine wherein control operation uses a PWM controlled inverter for secondary current excitation control of the winding type induction machine, connected to a transmission system, comprising the steps of:

detecting voltage distortion of a primary voltage of said winding type induction machine and producing a voltage distortion signal;

detecting a phase of said primary voltage of said winding type induction machine and producing a detected primary voltage phase;

detecting a rotational phase of a rotor of said winding type induction machine and producing a detected rotational phase;

calculating a phase of a secondary voltage of said winding type induction machine using said detected primary voltage phase and said detected rotational phase and producing a calculated secondary voltage phase;

generating voltage command signals for said PWM controlled inverter using said secondary current of said winding type induction machine, a current command value, and said calculated secondary voltage phase; and generating gate control signals for said PWM controlled inverter for performing PWM control, by modulating said voltage command signals with a triangular wave of modulation frequency responsive to a magnitude of said voltage distortion signal.

5. Operating control device for a winding type induction machine wherein control utilizes a PWM controlled inverter for secondary current excitation control of a secondary current of a winding type induction machine connected to a transmission system, comprising:

primary voltage phase detection means for detecting a phase of said primary voltage of said winding type induction machine and producing a detected primary voltage phase;

rotor phase detection means for detecting a rotational phase of a rotor of said winding type induction machine and producing a detected rotational phase;

secondary voltage phase calculation means for calculating a phase of a secondary voltage of said winding type induction machine responsive to said detected primary voltage phase and said detected rotational phase and producing a calculated secondary voltage phase;

secondary current control means for calculating voltage command signals for said PWM controlled inverter, responsive to a secondary current of said winding type induction machine, a current command value, and said calculated secondary voltage phase and outputting said voltage command signals;

means for generating a transmission system changeover signal; and gate control generating means responsive to said voltage command signals and said transmission system changeover signal for generating gate control signals for performing PWM control, by modulating said voltage command signals with a triangular wave of modulation frequency predetermined in accordance with said transmission system changeover signal.

6. Operating control device for a winding type induction machine as recited in claim 5, wherein said secondary current control means calculates said voltage command signals such that frequency of said secondary current is a frequency calculated by said secondary voltage phase calculation means and value of said secondary current is said current command value.

7. Operating control device for a winding type induction machine wherein control utilizes a PWM controlled inverter for secondary current excitation control of a secondary current of the winding type induction machine, connected to a transmission system, comprising the steps of:

detecting a phase of a primary voltage of said winding type induction machine and producing a detected primary voltage phase;

detecting a rotational phase of a rotor of said winding type induction machine and producing a detected rotational phase;

calculating a phase of a secondary voltage of said winding type induction machine using said detected primary voltage phase and said detected rotational phase and producing a calculated secondary voltage phase;

calculating voltage command signals for said PWM controlled inverter using said secondary current of said winding type induction machine, a current command value, and said calculated secondary voltage phase; and generating gate controls signal for said PWM controlled inverter to perform PWM control by modulating said voltage command signals with a triangular wave of modulation frequency that is predetermined in accordance with said transmission system changeover signal.

* * * * *